2,756,177

PROCESS FOR MAKING FAT-SOLUBLE VITAMIN ACTIVE POWDER

Marco Alfred Cannalonga, North Bergen, and Louis Magid, Passaic, N. J., assignors to Hoffmann-La Roche Inc., Nutley, N. J., a corporation of New Jersey No Drawing. Application March 9, 1953,
Serial No. 341,383

4 Claims. (Cl. 167—81)

This invention relates to novel compositions of matter in the form of dry, free-flowing powders containing a fat-soluble vitamin-active material, such powders being useful for administration as such and also for the formulation of pharmaceutical dosage forms, e. g., tablets, capsules, powders, and the like; and for the preparation of animal feeds. The invention relates further to novel processes for making such vitamin-active powders. More particularly, the invention relates to vitamin-active powders produced by processes hereinafter described.

An important object of the invention is to provide a vitamin-active preparation in the form of a dry, free-flowing powder characterized by high stability and high potency. A further object is to provide such a preparation which shall be especially suitable for incorporation in pharmaceutical formulations. A still further object is to provide such a preparation in which the proportion of non-active ingredients to vitamin-active material is as low as possible, having regard to the requirement for a dry, stable, highly potent powdered form.

In accordance with the invention, these objects are attained by mixing the vitamin-active material with other substances and converting the mixture to particulate form by the processes of the invention. By way of a brief description, it can be said that these processes comprise the steps of forming an emulsion containing: (a) vitamin-active material, (b) water, (c) gelatin and/or gum acacia, and (d) a sugar and/or a sugar alcohol; converting the emulsion to droplets; collecting the individual droplets in a mass of starchy powder in such a manner that the vitamin-active particles formed from the droplets are kept separated from each other until their particulate form is permanently established; and separating the vitamin-active particles from the starchy collecting powder.

The starchy powder used in our process to collect the droplets of emulsion can consist entirely of a starch and/or a starch chemically modified so as to impart to it in greater degree those characteristics found to be desirable in the collecting powder, as recited hereinbelow. The collecting powder can also contain, in addition to the starch and/or modified starch, minor amounts of lubricants and other modifiers, such as talc, silicic acid, flours, hydrogenated fats (e. g. "Sterotex," a hydrogenated vegetable oil product commercially distributed by Capital City Products, Columbus, Ohio) and metal salts of higher fatty acids (e. g., calcium stearate). Whatever its composition, the collecting powder should possess the following characteristics: it should be substantially insoluble in cold water and, moreover, should be resistant to wetting by water; it should have an appreciable capacity to absorb and/or adsorb water; and it should be free-flowing. A very important characteristic of the collecting powder is that its moisture content must be below about 8 per cent, still more desirably below about 6 per cent, and in a preferred embodiment, below about 3 per cent, e. g., in the range between about 1 per cent and 3 per cent. The desired moisture content can be easily attained by drying the commercially available starches or chemically modified starches.

In a preferred embodiment of the invention, the collecting powder consists substantially entirely of a starch modified to contain hydrophobic groups so as to possess the properties of free-flow and resistance to water-wetting to a higher degree than unmodified starch. Starch derivatives of this type, more particularly starch esters, are disclosed in United States Patent No. 2,613,206. A free-flowing starch ester, resistant to water-wetting, available commercially under the designation "Dry-Flo" and distributed by National Starch Products, Inc., New York, New York, has been found convenient to use as the specific starch ester for a preferred embodiment of the invention. As indicated, the "Dry-Flo" must be dried, to reduce its moisture content, before use.

Among the fat-soluble vitamin-active materials which can be used in practicing this invention are vitamin-bearing oils, provitamins, and pure or substantially pure vitamins, both natural and synthetic, or chemical derivatives thereof; crudes containing such substances; and mixtures thereof. We have been especially interested in preparing free-flowing powders containing vitamin A-active materials, more particularly vitamin A acetate or vitamin A palmitate, but it should be understood that the invention comprehends powders containing any fat-soluble vitamin-active material, e. g., vitamins A, D, E or K, carotene, and the like, or mixtures of such materials, when prepared according to a process disclosed and claimed herein.

As stated above, in practicing the invention a first step comprises emulsifying the fat-soluble vitamin-active material with water, gelatin and/or gum acacia, and a sugar and/or a sugar alcohol. Among the sugars and sugar alcohols used in forming the emulsions employed herein are glucose, sucrose, partially inverted sucrose, sorbitol, mannitol and the like. Antioxidants, such as tocopherols, butylated hydroxy-anisole, etc.; emulsifiers, such as lecithin; extenders and solubilizers, such as sesame oil, cottonseed oil and the like; odor-imparting agents; colors; and other adjuvants conventionally used in pharmaceutical formulations; can also be incorporated in the emulsions of this invention.

The preparation of the vitamin-containing emulsion can be effected by methods which will be apparent to those skilled in the art. As an example of a method which we have found satisfactory, we mention the following: The gelatin and/or gum acacia are dissolved in water with the aid of moderate heating, and the vitamin-active substance is then dispersed or emulsified in the solution of the gelatin and/or gum acacia. The sugar and/or sugar alcohol, as well as any adjuvants, can be introduced into the mixture either before or after adding the vitamin-active material. The mixture is agitated until all dispersoids are uniformly distributed; if necessary, by passing the mixture through a homogenizer.

The introduction of droplets of the vitamin-containing emulsion into the collecting powder can likewise be effected by various methods which will suggest themselves to those skilled in the art. An important concept in the practice of this step of our invention is that of keeping the vitamin-active particles formed in the collecting powder by the emulsion droplets separated from each other for a long enough time that they will "set up." That is, the vitamin-active particles should be kept separated from each other until their particulate form is permanently established, by loss of water, i. e., to such an extent that they will not agglomerate or coalesce during the most severe conditions of further processing, e. g., when the particles are spread out to dry on trays at about 45° C. The conversion of emulsion droplets to "set up" particles can obviously be attained in various ways. For example, the emulsion droplets can be let fall by a moving nozzle upon a stationary layer of collecting powder at such a space interval that the droplets do not run together. Or, the collecting powder can be presented as a moving layer (e. g., as on a conveyer belt) below a fixed nozzle adjusted to let the droplets fall at a rate such that the droplets do not run together in the powder. Still another method is represented by the spraying of emulsion droplets into an agitated mass of collecting powder, as in a tumbler or in a vessel provided with a stirrer. The particular method employed is not of the essence of the invention. However, a preferred method comprises introducing a spray of emulsion droplets into an agitated cloud or suspension in air of the particles of collecting powder. As illustrative of this latter, a method which we have found useful in quantity production comprises forcing the emulsion through a revolving spray head, having several rows of tiny orifices therein, into a suspension in air of the powdered starchy material, contained in and agitated by a revolving cylindrical drum, the drum and the spray head rotating in opposite directions so that the cloud or suspension of the starchy powder in air is swirling in a sense of rotation opposite to the entering emulsion spray.

The separation of the vitamin-active particles from the collecting powder can be accomplished by operations which are conventional per se. We have found it convenient simply to feed the mixture of powder and vitamin-active particles to a shaking screen of a size selected to retain the vitamin-active particles while passing the collecting powder. We have found it advantageous to so adjust the conditions under which the droplets of emulsion are formed (e. g., size of nozzle orifice, viscosity and percentage water content of emulsion, etc., as will be obvious to those skilled in the art) that the final size of the vitamin-active particles is substantially entirely in the range which will pass through a 10-mesh screen and be retained upon a 150-mesh screen. A preferred size of vitamin-active particle for certain pharmaceutical formulations is in the range which will pass through a 40-mesh screen and be retained upon a 140-mesh screen. The starchy collecting powder is selected to have a smaller particle size, i. e., the powder is substantially entirely in the range which will pass through a 150-mesh screen; it being understood that for any desired size range of vitamin-active particle, the particles of collecting powder employed will be selected in a range of appreciably smaller size. A preferred size for collecting powder is in the range which will pass substantially entirely through a 200-mesh screen.

The starchy collecting powder remaining after the screening step can be reused for further processing. After several "passes", i. e., after the starchy powder has been used to collect several batches of emulsion droplets, the collecting powder will have picked up sufficient moisture to require a drying operation in order to reduce its moisture content to below about 8 per cent.

The particles containing vitamin-active material formed in the collecting powder by the droplets of emulsion can be dried by various methods. The collecting powder itself effects a certain measure of drying insofar as it absorbs and adsorbs part of the water contained in the drops of emulsion, and this drying initiates the "setting up" phenomenon (i. e., the conversion of the droplet to a particle which will retain its particulate form even upon contact with other similar particles during further processing). The remaining water can be removed by various methods. For example, one can dry the entire mass (i. e., the collecting powder containing therein the vitamin-active particles), and then separate the collecting powder from the dried vitamin-active particles. We prefer, however, to separate the vitamin-active particles shortly after they are formed in the powder, i. e., after their particulate form has been permanently established but before they are completely dry; and then to dry the vitamin-active particles substantially free of collecting powder; for example, by exposing them to air at room temperature, or by moderate heating in an oven, or by combinations of these and other suitable methods.

A typical powder produced by our process, when examined under a magnification of about 24 diameters, is seen to consist almost entirely of generally ovoid to spheroid-shaped particles of fairly uniform size. If a single particle is sectioned and stained with iodine and examined at a magnification of about 120 diameters it becomes apparent that the particle has a rather irregular surface, and that adhering to the surface of the particle are grains of the starchy collecting powder, stained dark by the iodine. Examination of various batches of vitamin-active powder produced according to the invention indicates that in no case does the proportion of the starchy collecting powder adhering to the vitamin-active particles, after separation of the same from the collecting powder and drying, exceed more than about 25–30 per cent of the total weight of vitamin-active powder preparation, and that no fat-soluble vitamin is adsorbed on or absorbed in the starchy powder. Moreover, on continued screening of the vitamin-active powder, a portion of the adhering starchy powder can be shaken off, so that the final content of starchy powder can be reduced to not more than about 15 per cent of the total weight of finished vitamin-active powder preparation. It is apparent, then, that the powders of the invention differ markedly from prior art "adsorbate" type vitamin powders, basically comprised of fat-soluble vitamins adsorbed on and adsorbed in starch-containing granules. Presumably in consequence of their irregular surface and starchy powder coating, the dry vitamin-active powders produced by the processes of the invention have been found to possess advantages over prior art dry vitamin powders; e. g., ease and uniformity of mixing of the vitamin-active powder with other ingredients of pharmaceutical formulations is facilitated; "sticking" of such formulations, containing the powder of the invention, to tablet punches is obviated; and extrusion of the gelatin or gum acacia from tablets, after compression, is minimized.

To recapitulate, the invention relates to a process which comprises introducing, into a mass of starchy powder, droplets of an aqueous emulsion containing a fat-soluble vitamin-active material, keeping the vitamin-active particles formed by said droplets in said powder separated from each other until their particulate form has been permanently established, and separating from said powder the vitamin-active particles; said emulsion being one in which the continuous phase is an aqueous colloidal solution containing as the principal solid constituents material selected from the group consisting of gelatin and gum acacia, and also material selected from the group consisting of sugars and sugar alcohols, and in which the disperse phase comprises principally said fat-soluble vitamin-active material; said starchy powder containing not more than about 8 per cent moisture and being composed predominantly of material selected from the group consisting of starches and free-flowing starch esters containing a hydrophobic group and resistant to water wetting; said starchy powder being of substantially smaller dimensions than said vitamin-active particles. The invention further relates to a dry, free-flowing, vitamin-active powder produced by a process as just described.

A preferred embodiment of the invention relates to a process which comprises introducing, into an agitated cloud of starchy powder suspended in air, droplets of an aqueous emulsion containing vitamin A acetate, keeping the vitamin-active particles formed by said droplets in said powder separated from each other until their particulate form has been permanently established, and separating from said powder the vitamin-active particles; said emulsion being one in which the continuous phase is an aqueous colloidal solution containing as the principal solid constituents gelatin and sucrose, and in which the disperse phase comprises principally vitamin A acetate; said starchy powder containing not more than about 3 per cent moisture and being comprised predominantly of a free-flowing starch ester containing a hydrophobic group and resistant to water wetting; said starchy powder having a particle size substantially entirely finer than 200 mesh, and said vitamin-active particles having a particle size substantially entirely in the range of from about coarser than 140 mesh to about finer than 40 mesh.

It will ordinarily be desirable in practicing the invention to use materials of at least pharmaceutical grade wherever possible.

The invention is further disclosed in the following examples, which are illustrative but not limitative thereof.

This application is a continuation-in-part of our copending application Serial No. 286,626, filed May 7, 1952 now abandoned.

*Example 1*

100 g. of low bloom U. S. P. gelatin were dissolved in 100 g. of distilled water by heating to about 60° C. while stirring rapidly with a high speed stirrer under an atmosphere of nitrogen. 17.85 g. of crystalline vitamin A acetate, assayed at 2.9 million I. U./g. vitamin A activity, and previously melted at a temperature of about 65° C. under an atmosphere of nitrogen, were introduced into the solution. The mixture was stirred until the vitamin A acetate was well dispersed. A solution of 20 g. of sucrose in 20 g. of distilled water, previously heated to 50° C. was then added while stirring. An additional 33 g. of distilled water previously heated to about 50° C. was added while stirring. The emulsion thus obtained was loaded into an apparatus provided with a revolving spray head and a counter-rotating drum, as above described. The drum was loaded with 2 kg. of "Dry-Flo," previously dried to a moisture content of about 3 per cent. After all the emulsion had been collected in the "Dry-Flo," the mixture of starch and vitamin-active particles was allowed to stand for about an hour and was then screened through a 150 mesh screen. The vitamin-active particles retained upon the screen were collected, spread out on drying trays and then dried in an oven at 45° C. for 24 hours.

The dry, free flowing powder containing vitamin A acetate, thus obtained, had a particle size in the range of finer than 40 mesh and coarser than 150 mesh and assayed 250,000 I. U./g. of vitamin A activity. Its "Dry-Flo" content was approximately 25 per cent by weight. Upon continued screening of the vitamin-active powder on 150 mesh screens, the "Dry-Flo" content was reduced to about 16 per cent, and the activity assay rose to about 273,000 I. U./g.

*Example 2*

100 g. of high bloom U. S. P. gelatin were dissolved in 150 g. of distilled water by heating to about 60° C. While stirring rapidly with a high speed stirrer under an atmosphere of nitrogen, 40 g. of crystalline vitamin A acetate, assayed at 2.9 million I. U./g., and previously melted at a temperature of about 65° C. under an atmosphere of nitrogen, were introduced into the solution. The mixture was stirred until the vitamin A acetate was well dispersed. A solution of 20 g. of sucrose in 20 g. of distilled water, previously heated to 50° C. was then added while stirring. An additional 90 g. of distilled water previously heated to about 50° C. was added while stirring. The emulsion thus obtained was loaded into an apparatus provided with a revolving spray head and a counter-rotating drum, as above described. The drum was loaded with 2 kg. of "Dry-Flo," previously dried to a moisture content of about 3 per cent. After all the emulsion had been collected in the "Dry-Flo," the mixture of starch and vitamin-active particles was allowed to stand for about an hour and was then screened through a 150 mesh screen. The vitamin A-containing particles retained upon the screen were collected, spread out on drying trays and then dried in an oven at 45° C. for 24 hours.

The dry, free flowing powder containing vitamin A acetate, thus obtained, had a particle size in the range of finer than 40 mesh and coarsesr than 150 mesh and assayed 500,000 I. U./g. Its "Dry-Flo" content was approximately 25 per cent by weight.

*Example 3*

133 g. of d-sorbitol and 25 g. of a low bloom U. S. P. gelatin were dissolved in 90 g. of distilled water by heating to about 90° C. The solution was cooled to 50° C. and, while stirring rapidly with a high speed mixer under an atmosphere of nitrogen, 25 g. of crystalline vitamin A acetate, 2.9 million I. U./g., previously melted at a temperature of about 65° C. under atmospheric nitrogen, were introduced into the solution. The mixture was stirred until the vitamin A acetate was well dispersed and was then passed through a homogenizer to obtain a uniform emulsion. The emulsion thus obtained was loaded into an apparatus provided with a revolving spray head and a counter-rotating drum, as above described. The drum was loaded with 1,500 g. of food grade corn starch, previously dried to a moisture content of about 3 per cent. After all the emulsion had been collected in the starch, the mixture of starch and vitamin-bearing particles was allowed to stand for about 10 minutes and was then screened through an 80-mesh screen. The vitamin A acetate-containing particles retained upon the screen were collected, spread out on drying trays and exposed to air at room temperature for about 24 hours and then dried in an oven at 37° C. for an additional 24 hours.

The dry, free-flowing powder containing vitamin A acetate thus obtained had an average size substantially entirely in the range of from about 30 mesh to about 40 mesh.

*Example 4*

In the manner described in the preceding example, an emulsion was formed containing 133 g. of d-sorbitol, 25 g. of vitamin A palmitate (potency 1.8 million I. U./g.) and 30 g. of low bloom U. S. P. gelatin in 90 g. of distilled water. Before adding the vitamin A palmitate, 0.52 g. of an antioxidant ("Tenox II," distributed by the Tennessee Eastman Co., Kingsport, Tennessee, containing butylated hydroxy anisole, propyl gallate, citric acid and propylene glycol) was also added to the mixture.

The emulsion thus obtained was formed into particles (average size: 30 mesh to 40 mesh) by means of the same apparatus and in the same manner as described in the preceding example.

*Example 5*

In a manner similar to that described in Example 3, an emulsion was prepared from the following ingredients:

266 g. d-sorbitol
50 g. gelatin, low bloom, U. S. P.
77 g. vitamin A acetate, crystalline, 2.9 million I. U./g.
220 g. water, distilled.

Approximately 50 g. of the emulsion thus obtained was loaded into a hypodermic syringe having a 27 gauge needle and forced through the needle into 1,500 g. of "Dry-Flo" contained in an open vessel, while stirring the "Dry-Flo." After all the emulsion had been collected in the "Dry-Flo," the entire mixture was spread out in shallow drying trays and dried first in air at room temperature for 24 hours and then in an oven at 37° C. for 24 hours. The dried mixture was then screened through an 80-mesh screen and the vitamin-containing particles retained on the screen were collected.

Example 6

In a manner similar to that described in Example 3, a vitamin A-active powder was prepared from the following ingredients:

108 g. d-sorbitol
50 g. gelatin, low bloom, U. S. P.
35 g. vitamin A palmitate, potency 1.3 million I. U/g.
2 g. mixed tocopherols, 34 per cent w./w.
6 g. "Antarox 404" [1]
100 g. water, distilled.

Example 7

In a manner similar to that described in Example 3, an emulsion was prepared from the following ingredients:

266 g. d-sorbitol
50 g. gelatin, high bloom, U. S. P.
60 g. vitamin A acetate, potency 2.3 million I. U./g.
135 g. water, distilled.

The emulsion thus prepared was formed into vitamin A-active particles by a procedure similar to that described in Example 3, except that the collecting powder consisted of:

1,300 g. corn starch, food grade
100 g. silicic acid
100 g. calcium stearate, pharmaceutical grade.

Example 8

510 g. of low bloom U. S. P. gelatin were dissolved in 510 g. of distilled water by heating to about 60° C. The solution was cooled to 50° C.; and while stirring rapidly with a high-speed mixer under an atmosphere of nitrogen, 12.5 g. of calciferol (40 million I. U./g. vitamin D activity), previously dissolved in 80 g. of U. S. P. sesame oil at 65° C. under atmosphere of nitrogen, were introduced into the solution. The mixture was stirred until the vitamin $D_2$-sesame oil solution was well dispersed. A solution of 100 g. of sucrose in 100 g. of distilled water, previously heated to about 50° C., was then added while stirring. An additional 400 g. of distilled water, previously heated to about 50° C., was added while stirring. The emulsion thus obtained was loaded into an apparatus provided with a revolving spray head and a counter-rotating drum, as above described. The drum was loaded with 10 kg. of "Dry-Flo," previously dried to a moisture content of about 3 per cent. After all the emulsion had been collected in the "Dry-Flo," the mixture of starch and vitamin-bearing particles was allowed to stand for about an hour and was then screened through a 120 mesh screen. The vitamin $D_2$-containing particles retained upon the screen were collected, spread out on drying trays and then dried in an oven at 45° C. for 24 hours.

The dry, free flowing powder containing vitamin $D_2$ thus obtained, had a particle size in the range of finer than 30 mesh and coarser than 120 mesh and contained 500,000 I. U./g. of vitamin D activity. Its "Dry-Flo" content was approximately 25 per cent.

Example 9

50 g. of low bloom U. S. P. gelatin were dissolved in 50 g. of distilled water by heating to about 60° C. The solution was cooled to 50° C. and while stirring rapidly with a high-speed stirrer under an atmosphere of nitrogen, 10 g. of carotene (90 per cent beta, 10 per cent alpha; 1,670,000 I. U./g. vitamin A activity) were introduced into the solution. The mixture was stirred until the carotene was well dispersed. A solution of 10 g. of sucrose in 10 g. of distilled water, previously heated to about 50° C., was added while stirring. An additional 95 g. of distilled water, previously heated to about 50° C. was added while stirring. The emulsion thus obtained was loaded into an apparatus provided with a revolving spray head and a counter-rotating drum, as above described. The drum was loaded with 1 kg. of "Dry-Flo," previously dried to a moisture content of about 3 per cent. After all the emulsion had been collected in the "Dry-Flo," the mixture of starch and vitamin-bearing particles was allowed to stand for about an hour and was then screened through a 120-mesh screen. The carotene-containing particles retained on the screen were collected, spread out on drying trays and then dried in an oven at 45° C. for 24 hours.

The dry, free flowing powder containing carotene, thus obtained, had a particle size in the range of finer than 30 mesh and coarser than 120 mesh and assayed 167,000 I. U./g. of vitamin A activity. Its "Dry-Flow" content was approximately 25 per cent.

We claim:

1. In a process which includes a step (1) of forming an aqueous emulsion containing dispersed therein a fat-soluble vitamin-active material and a protective colloid, and a step (2) of converting said emulsion to a dry particulate form containing the non-aqueous constituents of said emulsion: the improvement which comprises effecting said step (2) by introducing droplets of said emulsion into a mass of starchy powder pre-dried to a moisture content of not more than about 8 per cent, keeping said droplets in said powder separated from each other until a particulate form has been established in the individual droplets by loss of a portion of their contained water to the starchy powder, and then completing the drying of the individual partially dry vitamin-active particles so formed; the individual droplets of said emulsion containing such amount of non-aqueous constituents that upon complete drying the vitamin-active particles formed from the respective droplets are substantially entirely in the range from about coarser than 150 mesh to about finer than 10 mesh; the grains of said starchy powder being substantially entirely finer than 150 mesh.

2. In a process which includes a step (1) of forming an aqueous emulsion containing dispersed therein a fat-soluble vitamin-active material and a protective colloid, and a step (2) of converting said emulsion to a dry particulate form containing the non-aqueous constituents of said emulsion: the improvement which comprises effecting said step (2) by introducing droplets of said emulsion into a mass of starchy powder pre-dried to a moisture content of not more than about 6 per cent, keeping said droplets in said powder separated from each other until a particulate form has been established in the individual droplets by loss of a portion of their contained water to the starchy powder, and then completing the drying of the individual partially dry vitamin-active particles so formed; the individual droplets of said emulsion containing such amount of non-aqueous constituents that upon complete drying the vitamin-active particles formed from the respective droplets are substantially entirely in the range from about coarser than 140 mesh to about finer than 40 mesh; said starchy powder being comprised predominantly of material selected from the group consisting of starches and free-flowing starch esters containing a hydrophobic group and resistant to water-wetting, and having a particle size substantially entirely finer than 200 mesh.

3. A process which comprises introducing, into a mass of starchy powder, droplets of an aqueous emulsion of a fat-soluble vitamin-active material, keeping said droplets in said powder separated from each other until the individual droplets have been converted to particles by loss of at least a portion of their contained water, and separating from said powder the vitamin-active particles so formed; said emulsion being one in which the continuous phase is an aqueous colloidal solution containing as the principal solid constituents material selected from the group consisting of gelatin and gum acacia and also material selected from the group consisting of sugars and sugar alcohols, and in which the disperse phase comprises principally said

---

[1] An alkyl aryl polyoxyethylene glycol, distributed by Antara Products Division, General Dyestuff Corp., New York, New York.

fat-soluble vitamin-active material; the individual droplets of said emulsion containing such amount of non-aqueous constituents that upon complete drying the vitamin-active particles formed from the respective droplets are substantially entirely in the range from about coarser than 150 mesh to about finer than 10 mesh; said starchy powder containing not more than about 8 per cent moisture and being comprised predominantly of material selected from the group consisting of starches and free-flowing starch esters containing a hydrophobic group and resistant to water-wetting, and said starchy powder having a particle size substantially entirely finer than 150 mesh.

4. A process which comprises introducing, into a mass of starchy powder, droplets of an aqueous emulsion of a vitamin A ester, keeping said droplets in said powder separated from each other until the individual droplets have been converted to particles by loss of at least a portion of their contained water, and separating from said powder the vitamin-active particles so formed; said emulsion being one in which the continuous phase is an aqueous colloidal solution containing as the principal solid constituents gelatin and a sugar, and in which the disperse phase comprises principally said vitamin A ester; the individual droplets of said emulsion containing such amount of non-aqueous constituents that upon complete drying the vitamin-active particles formed from the respective droplets are substantially entirely in the range from about coarser than 140 mesh to about finer than 40 mesh; said starchy powder containing not more than about 6 per cent moisture and being comprised predominantly of a free-flowing starch ester containing a hydrophobic group and resistant to water-wetting, and said starchy powder having a particle size substantially entirely finer than 200 mesh.

References Cited in the file of this patent

UNITED STATES PATENTS

| | | |
|---|---|---|
| 2,146,867 | Welin | Feb. 14, 1939 |
| 2,218,592 | Taylor | Oct. 22, 1940 |
| 2,282,788 | Musher | May 12, 1942 |
| 2,399,717 | Arveson | May 7, 1946 |
| 2,410,110 | Taylor | Oct. 29, 1946 |
| 2,562,840 | Caldwell | July 31, 1951 |
| 2,650,895 | Wallenmeyer | Sept. 1, 1953 |

FOREIGN PATENTS

| | | |
|---|---|---|
| 531,225 | Great Britain | Dec. 31, 1940 |
| 533,323 | Great Britain | Feb. 11, 1941 |

OTHER REFERENCES

Little: Tablet Making (1949), pp. 83 and 14.
Wood: Tablet Manufacture (1904), pp. 41, 42.